US010252390B2

(12) United States Patent
Aygün et al.

(10) Patent No.: US 10,252,390 B2
(45) Date of Patent: Apr. 9, 2019

(54) LUBRICATION SYSTEM COMPRISING A SPINDLE AND AN AEROSOL DISPENSER

(71) Applicant: KNOLL MASCHINENBAU GMBH, Bad Saulgau (DE)

(72) Inventors: Talip Aygün, Krauchenwies (DE); Yasar Aygün, Krauchenwies (DE)

(73) Assignee: Knoll Maschinenbau GmbH, Bad Saulgau (DE)

( * ) Notice: Subject to any disclaimer, the term of this patent is extended or adjusted under 35 U.S.C. 154(b) by 0 days.

(21) Appl. No.: 15/808,016

(22) Filed: Nov. 9, 2017

(65) Prior Publication Data
US 2018/0085875 A1    Mar. 29, 2018

Related U.S. Application Data (63) Continuation of application No. PCT/EP2016/060821, filed on May 13, 2016.

(30) Foreign Application Priority Data

May 13, 2015    (DE) .................... 20 2015 102 484 U (51) Int. Cl.
*B23Q 11/00* (2006.01)
*B23Q 11/10* (2006.01)

(52) U.S. Cl.
CPC ...... *B23Q 11/1015* (2013.01); *B23Q 11/0046* (2013.01); *B23Q 11/1076* (2013.01)

(58) Field of Classification Search
CPC ........... Y10T 409/303976; Y10T 409/304032; B23Q 11/1015; B23Q 11/1076
See application file for complete search history.

(56) References Cited

U.S. PATENT DOCUMENTS 3,491,651 A *  1/1970  Pascoe ................... B26F 3/06
                                                                219/233
5,676,506 A   10/1997  Sugata
(Continued)

FOREIGN PATENT DOCUMENTS

DE        42 00 808 A1     9/1993
DE        196 55 256 B4    7/2005
(Continued)

OTHER PUBLICATIONS

International Search Report and Written Opinion (Application No. PCT/EP2016/060821) dated Oct. 14, 2016.
(Continued)

*Primary Examiner* — Nicole N Ramos
(74) *Attorney, Agent, or Firm* — Burr & Brown, PLLC (57) ABSTRACT

Proposed is a lubrication system, in particular a single-duct minimum quantity lubrication system, having an aerosol generator, a spindle, a tool clamper arranged on the spindle and a rotary feedthrough arranged on the side of the spindle located opposite the tool clamper, the tool clamper, the spindle and the rotary feedthrough are penetrated by a duct, in the duct is arranged a spindle tube which improves the transport of aerosol, in particular the transport of lubricant particles and/or coolant particles, above all inside the spindle or motor spindle. Further, the spindle tube is mounted in the duct in an electrically insulating manner and/or in that the spindle tube is produced from a material that is not electrically conducting and/or in that the spindle tube and/or the duct is/are provided with at least one electrically insulating layer for coating the spindle tube and/or the duct in an electrically insulating manner.

10 Claims, 3 Drawing Sheets (56) References Cited

U.S. PATENT DOCUMENTS

| | | | | |
|---|---|---|---|---|
| 6,981,825 B2* | 1/2006 | Sugata | ................ | B23Q 11/103 |
| | | | | 408/56 |
| 2006/0029480 A1* | 2/2006 | Stoll | ................... | B23B 31/1179 |
| | | | | 409/136 |
| 2010/0272530 A1* | 10/2010 | Rozzi | ................ | B23Q 11/1015 |
| | | | | 408/56 |

FOREIGN PATENT DOCUMENTS

| | | |
|---|---|---|
| DE | 196 55 334 B4 | 5/2006 |
| WO | 03/106104 A1 | 12/2003 |

OTHER PUBLICATIONS

English translation of International Preliminary Report on Patentability (Chapter I) (Application No. PCT/EP2016/060821) dated Nov. 23, 2017, 8 pages.

* cited by examiner

LUBRICATION SYSTEM COMPRISING A SPINDLE AND AN AEROSOL DISPENSER

CROSS REFERENCE TO RELATED APPLICATIONS

This application is a continuation of International Application No. PCT/EP2016/060821 filed May 13, 2016, which designated the United States, and claims the benefit under 35 USC § 119(a)-(d) of German Application No. 20 2015 102 484.3 filed May 13, 2015, the entireties of which are incorporated herein by reference.

FIELD OF THE INVENTION

The present invention relates to a lubrication system, in particular, a single-duct minimum quantity lubrication system, having an aerosol generator and a spindle.

BACKGROUND OF THE INVENTION

In a variety of technical working procedures when processing materials, for example, when machining materials, it is advantageous to provide lubrication and/or cooling at the processing point to increase process reliability in order, among other things, to ensure the perfect functioning of a tool and to increase its service life.

In order, for example, to keep down the costs for the respective lubricant and/or coolant and the amount spent on cleaning the environment and the products produced and, in addition, to keep down the impact on the environment and on the health of the operating personnel, attempts have already been made to manage with small flows of lubricant and/or coolant. This approach is already known by the term "minimum quantity lubrication" (MQL), a corresponding system is usually designated as a "minimum quantity lubrication system" (MQL system). Usual lubricant flows and/or coolant flows in such minimum quantity lubrication systems comprise flow rates of, for instance, around a maximum of 50 ml/h and typically approximately between 10 and 50 ml/h, the lubricant or coolant being supplied to the tool/workpiece in the usual manner as an aerosol.

An aerosol is to be understood, in general, as a heterogeneous mixture or a dispersion produced from solid or liquid airborne particles in a gas. The airborne particles contained in the aerosol are also called aerosol particles or aerosol particulates or aerosol droplets. The behavior of an aerosol depends in the majority of cases on the particles and on the carrier gas. An aerosol as a whole or unit substantially comprises a dynamic, flowing, fluid-like behavior or fluid-like characteristics. In the case of such lubrication systems, for example, for machine tools or motor spindles or the like, a lubricant and/or coolant or a so-called "cooling lubricant" is usually used for the aerosol particles, additives for corrosion protection, emulgation, stabilization, de-foaming, etc. being contained, in particular, along with water and oils.

To date, the difference has been made in the majority of cases in practice between so-called two-duct minimum quantity lubrication systems (from now on designated in short as so-called two-duct MQL systems), as are disclosed, for example, in DE 196 55 334 B4, and so-called single-duct minimum quantity lubrication systems (from now on designated in short as so-called single-duct MQL systems).

In the case of so-called two-duct MQL systems, the aerosol is not generated until close to the tool holder, frequently by means of separately supplied lubricant and/or coolant as well as compressed air, in order to avoid relatively long aerosol transport paths and to enable as rapid as possible reaction times in the case of adaptations/changes to the required quantities of lubricant and/or coolant. Correspondingly, lubricant and/or coolant and air are run through the tool spindle in two separate ducts and the aerosol is only formed at the or in the vicinity of the rotatable/rotating tool holder.

In the case of so-called single-duct MQL systems, an aerosol generator, which is separate to the spindle or motor spindle or is arranged externally/outside and in which the aerosol is generated from lubricant and/or coolant and compressed air, is usually provided in practice. The aerosol is injected/fed, for example, into an aerosol line or aerosol transport line and from there is supplied, among other things, via rotary feedthrough, spindle/motor spindle and tool holder to the tool/workpiece.

In general, the transport of the aerosol is effected by means of flowing air or compressed air and is usually controlled, in this connection, by the pressure of the (compressed) air. In particular, the direction of transport or the direction of flow is through the path that the compressed air takes, and the velocity of flow/speed of flow of the aerosol is also at least determined by the pressure of the compressed air.

It has been shown in the meantime in practice that in the case of so-called single-duct MQL systems, in particular, when used with machines with spindles, the transport of the aerosol through the spindle can cause problems which result in the aerosol feed or the quantities of lubricant and/or coolant flowing to/arriving at the tool/workpiece being smaller than actually provided/required. Thus, among other things, losses occur as a result of the aerosol particles condensing sometimes to a large extent, among other things, on the transport lines and/or being lost inside the spindle as a result of leakages, which results in a disadvantageous increase in the quantities of lubricant and/or coolant to be used and in unwanted contaminants in the spindle such that the desired effects of the minimum quantity lubrication are no longer realized in a sufficient manner.

SUMMARY OF THE INVENTION

It is the object of the present invention to propose a lubrication system, in particular, a single-duct minimum quantity lubrication system, having an aerosol generator and a spindle or motor spindle, which lubrication system improves the aerosol transport, in particular, the transport of lubricant particles and/or coolant particles above all inside the spindle or motor spindle.

Accordingly, a lubrication system according to the present invention is characterized in that the spindle tube is mounted in an electrically insulating manner on the rotary feedthrough and/or on the tool clamper and/or the spindle tube is produced from a material that is not electrically conductive, for example, plastics material or ceramic, and/or that the spindle tube and/or the duct is/are provided with at least one electrically insulating layer for coating the spindle tube and/or the duct in an electrically insulating manner. This shows that the transport of aerosol to the tool clamper is considerably improved as the aerosol or the aerosol particles is/are substantially electrically charged.

Expensive and numerous tests or investigations were able to ascertain that the aerosol or the aerosol particles become electrically charged when generated/atomized or transported through the aerosol line and, among other things, interact with the spindle tube or the aerosol duct. On account of this, in the prior art aerosol particles or lubricant and/or coolant are deposited on the inner wall of the aerosol line and of the spindle tube, which is disadvantageous because the lubricant and/or coolant or the aerosol particles are not available (immediately or promptly) to the tool clamper and consequently for workpiece processing. Thus, in the prior art, the deposited or separated lubricant and/or coolant then has to be compensated for by an additionally generated quantity of aerosol particles, which increases the consumption of lubricant and/or coolant and is not wanted.

Thus, electric insulation or an electrically insulated bearing arrangement of the aerosol transport or of the aerosol unit according to the present invention is particularly advantageous in order to limit the consumption of lubricant and/or coolant to what is absolutely necessary or to keep it particularly low.

For example, the electrically insulating layer or covering of the spindle tube and/or of the duct is realized as an insulating varnish film, plasma ceramic (in particular, so-called PEO technology) or the like. Electric insulation of the aerosol transport or of the aerosol unit can be implemented in this way with particularly low structural expenditure.

Particularly preferred is a realization of an electrically insulating bearing arrangement or shielding according to the present invention, where the spindle tube is not mounted in a rotatable manner preferably on the non-rotating portion of the rotary feedthrough, for example, by means of a plug connection with a socket or a cone or the like produced from electrically insulating material which is connected directly or indirectly to the non-rotating portion of the rotary feedthrough, and/or where the spindle tube is mounted on the tool clamper so as to be rotatable in a bearing which is connected directly or indirectly to the tool clamper by means of a socket or a cone or the like produced from electrically insulating material.

The bearing can be realized, for example, as an air bearing, sliding bearing, roller bearing, magnetic bearing, shaft seal, mechanical seal and/or can be produced (directly) from electrically insulating material such as, for example, ceramic roller bearings and/or can include a ceramic insulation such as a coating, sleeve or a hollow cylinder element and/or ceramic rolling elements/ceramic balls etc. produced from ceramic material.

The electric insulation according to the present invention of the spindle tube is of great advantage both for a spindle tube which consists of electrically conducting material or of a material that is not electrically conducting and/or is mounted/arranged non-rotatably or statically or rotatably/rotationally in the spindle/motor spindle or the rotor. Disadvantageous depositing or condensing of the aerosol particles or of the lubricant and/or coolant can be effectively prevented in this way such that the aerosol transport or the lubrication of the tool/workpiece is able to be optimized or minimized. Consequently, it is possible to adapt the quantity of required aerosol particles to the job or to the most varied jobs/applications in a particularly precise and/or comparatively rapid/prompt manner.

In a particular further development of the present invention, a spindle tube is arranged in the duct, which spindle tube is non-rotatably mounted on a non-rotating portion of the rotary feedthrough and extends in the direction toward the (rotating/rotatable) tool clamper at least through a portion of the spindle and the aerosol generator (which is not-rotating/static or, with reference to the stator of the spindle, is arranged externally/outside) is connected to the (non-rotating/static) spindle tube such that aerosol is guided through the (non-rotating/static) spindle tube in the direction of the (rotating/rotatable) tool clamper and/or of a (rotating/rotatable) tool that is clamped by the tool clamper. This means that the spindle tube according to the present invention is situated/arranged inside the duct or inside a central/centric hollow space/passage of the spindle or motor spindle, in particular, of a rotating/rotatable rotor of the spindle, and is in addition non-rotating or fixed/static. A connection/bearing arrangement/fixing to or with the rotary feedthrough or a (non-rotating) stator of the spindle/motor spindle is advantageously provided in this connection.

The stationary, i.e. non-rotating or non-rotary spindle tube prevents a centrifugal force/centrifugal action being generated onto the aerosol or the aerosol particles as a result of the effects of flow entrainment of the rotating wall or inner wall as in the case of the prior art with a rotating aerosol tube/aerosol duct such that they are condensed on the inner wall and are not transported/guided or are badly transported/guided further to the tool clamper or the tool.

The rotary feedthrough or the corresponding component of the stator/stator housing makes it possible, in this connection, for an aerosol or aerosol flow to have a (preferably sealed) transition between a fixed element/stator and a rotating element/rotor of the spindle or motor spindle. In terms of the present invention, in this connection, the spindle tube is a component part or a component of the rotary feedthrough as the aerosol reaches the tool clamper or the rotor, which rotates in operation, by means of the stationary spindle tube, which is arranged/fixed in the rotary feedthrough or the end-face inlet/inflow duct of the spindle/motor spindle or stator/stator housing.

A separate aerosol generator is preferably provided, i.e., arranged externally on the stator/stator housing or arranged outside/at a spacing with reference to the spindle or motor spindle, in which the aerosol generator generates aerosol from lubricant and/or coolant and (compressed) air. The aerosol is injected/fed, for example, into an aerosol line or aerosol transport line and from there is supplied/transported into the spindle/motor spindle or into the rotatable rotor among other things by means of the rotary feedthrough and the spindle tube according to the present invention up to the tool holder or the tool/workpiece.

The generation and/or the transport of the aerosol is preferably effected by means of flowing air or compressed air and/or by means of pressure or high pressure of up to approximately 3000 bar being applied to the lubricant and/or coolant. The flow speed of the aerosol or the quantity of lubricant and/or coolant (per unit time) is regulated/controlled, in this connection, in an advantageous manner by the pressure of the (compressed) air and/or by the injection pressure and/or by the injection duration or the injection rhythm/injection pulsing of the lubricant and/or coolant.

For example, to generate an aerosol a high-pressure pump generates an injection pressure of the lubricant and/or coolant of up to 3000 bar, preferably for instance of between 250 and 2500 bar. An advantageous electronic control unit of the aerosol generator or of the high-pressure pump and/or of at least one advantageous controllable injection nozzle, in particular, of a high-pressure injection nozzle preferably with a nozzle duct or at least two nozzle ducts for atomizing/spraying intersecting or colliding liquid jets, can be used, on the one hand, for the regulation/control of the injection pressure and/or of the injection duration and/or the injection rhythm/injection pulse and/or, on the other hand, for the regulation/control of the air pressure or of the flow speed of the air or of the aerosol flow. Advantageous aerosol generation or regulation of the smallest or minimum quantities of lubricant and/or coolant can be achieved precisely by means of injecting the lubricant and/or coolant in a (high-pressure)

pulsed manner, for example, injection pulses of a few microseconds/milliseconds which are interrupted by injection intervals with a length of seconds or fragments of seconds are provided. In this connection, it is also possible to realize a very precise/metered or advantageous adaptation to the quantities of lubricant and/or coolant required at the tool/workpiece by the most varied of jobs (tool type such as, for example, milling cutters, drilling tools, honing tools etc., workpiece diameter, feed, cutting speed, tool/workpiece material or the like).

The lubrication system according to the present invention, in particular, a single-duct minimum quantity lubrication system, comprises at least one aerosol generator, a spindle, a tool clamper arranged on the spindle and a rotary feedthrough arranged on the side of the spindle located opposite the tool clamper, wherein the tool clamper, the spindle and the rotary feedthrough are penetrated by a duct. Generally, the spindle, tool clamper and rotary feedthrough are substantially rotationally symmetrical parts and the duct, which can be realized, for example, as a bore, is located on a common rotational axis of the spindle, tool clamper and rotary feedthrough. In this case, the tool clamper can be both an automatic clamper and a manual clamper.

Correspondingly, at least in the region of the spindle or of the rotor, counter to the usual practice in the case of single-duct MQL systems, the aerosol is not guided primarily or necessarily through the duct of the rotor, but through a spindle tube according to the present invention which is arranged in the duct and is advantageously mounted non-rotatably on a non-rotating portion of the rotary feedthrough and extends in the direction toward the tool clamper at least through a portion of the spindle. Correspondingly, according to the present invention, the spindle tube guides or transports the aerosol along/lengthwise of an inner wall or in the inner cylindrical hollow space.

In this way, the aerosol generator is not directly connected to the entire duct, but to the spindle tube arranged in/inside the duct—preferably concentrically to the longitudinal axis of duct and spindle/rotor—, such that aerosol is guided through the spindle tube in the direction of the tool clamper and/or of a tool that is clamped by way of the tool clamper. This measure leads to a noticeable improvement in the forwarding of the aerosol to the tool clamper. External influence factors are excluded and the efficiency of the forwarding is increased, in particular, as a result.

Experimental tests show that the problems during aerosol transport are significantly reduced as a result of the provision according to the present invention of a non-rotatably mounted spindle tube inside the duct portion that penetrates the spindle and through which the aerosol is transported in the direction of the tool clamper.

It is particularly preferred, in this case, when the spindle tube extends into the tool clamper.

It is particularly advantageous when the spindle tube is mounted not only on the rotary feedthrough, but also on the tool clamper as this increases the mechanical stability of the spindle tube and supports the alignment thereof lengthwise of the rotational axis. As the tool clamper is rotated with the spindle, the bearing arrangement has to be realized so as to be rotatable.

A preferred variant, where such a rotatable bearing arrangement of the spindle tube can be realized on the tool clamper, consists specifically in screwing a counter screw with arranged thereon a bearing which can be realized, for example, as an air bearing, sliding bearing, roller bearing, magnetic bearing, shaft seal or mechanical seal, in the region of the duct which extends in the tool clamper, which counter screw is penetrated by an opening such that aerosol emerging out of the spindle tube is directed into a coolant transfer tube.

In a particular further development of the present invention, the spindle tube is arranged at least in part inside an aerosol duct for the conveying/guiding of aerosol such that aerosol is conveyed/guided both on/lengthwise of an inner wall of the spindle tube and in part on/lengthwise of an outer wall of the spindle tube. Thus, firstly, the aerosol or a large part of the aerosol can be transported/guided inside the (hollow-cylindrical) spindle tube and, additionally, secondly, the aerosol or a small proportion can be transported/guided outside the spindle tube, however ideally inside the aerosol according to the invention, i.e. inside the abovementioned coolant transfer tube. For example, disadvantageous leaks or contaminants of the spindle/motor spindle or of the rotor, in particular, of the electromagnetic drive system of the motor spindle, can be effectively prevented/reduced in this way. This means that the advantageous aerosol duct or the coolant transfer tube is realized as a protective tube or sealed unit.

The transfer or distribution of the aerosol to both sides of the spindle tube, i.e. externally and internally, can be effected by means of accepted leakages or joints between two adjacent elements.

Defined or controlled distribution of the aerosol is preferably provided. Thus, in an advantageous manner, the spindle tube comprises at least one control opening or spindle tube opening for the traversing of aerosol. A defined distribution/allocation of the aerosol flow can be realized by means of the spindle tube opening or control opening. The proportion of the aerosol or aerosol flow for the outside and/or the inside or the interior of the spindle tube or for the aerosol duct can also be adjusted/adapted or amended, among other things, as a result of the free/open cross-sectional surface of the spindle tube opening and/or as a result of an advantageous application of pressure on the aerosol.

In an advantageous variant of the present invention, the spindle/motor spindle includes at least one aerosol unit, inside which the aerosol is guided or flows and is directed. At least one sealing device of a shell/housing of the aerosol unit is preferably provided. Disadvantageous loss or leakage of aerosol, in particular, of lubricant/coolant, can be effectively prevented as a result.

The aerosol duct is advantageously realized as a shell element and/or housing element of an aerosol unit of the spindle/motor spindle. As a result, it is possible to realize an advantageous delimitation or a closure of a preset/defined region/area about the or outside the spindle tube according to the present invention which includes the aerosol or in which the aerosol is guided or regulated. Other components of the spindle/motor spindle can thus be protected or separated effectively from leakages or inadvertently escaping aerosol, in particular, from aerosol particles, such as, for example, the electromagnetic drive system and/or electronic components, etc.

In an advantageous further development of the present invention, the aerosol duct is realized as a rotatable duct tube. This is particularly advantageous precisely in combination with the static or non-rotatable spindle tube. Thus, an advantageous transition can be implemented between the static/non-rotatable spindle tube and the rotating/rotary rotor, which is relevant, above all, in the case of high-speed spindles/motor spindles running in part at 20,000 rpm. For example, the transition or the relative movement of the components is effected by means of advantageous rotary bearings, such as roller bearings and/or sliding bearings and/or hydrostatic bearings/aerostatic bearings.

Thus, the two, preferably concentric hollow cylinders, i.e. spindle tube and aerosol duct, are substantially spaced apart from one another such that for the most part a hollow space or air/aerosol is present between the two components, as a result of which friction, abrasion or heat generation is effectively prevented here. The dimensioning of the rotary bearing arrangement between the two components can be matched structurally in an advantageous manner to the special requirements or, in part, to the very high speeds, i.e. enormous speed differences, corresponding to spindles/motor spindles.

At least one, in particular two rotary bearings are advantageously arranged between the spindle tube and the rotatable duct tube. This means that a structurally or constructionally advantageous bearing arrangement can be realized. A rotary bearing, in particular a sliding bearing and/or needle bearing, is preferably provided in the region and/or by means of the tool clamper between the spindle tube and the rotatable duct tube. On the oppositely arranged end region of the duct tube or of the spindle tube, where applicable, in a particular variant of the present invention, it is possible to dispense with a (second) rotary bearing between the spindle tube and the rotatable duct tube, by, for example, the rotatable/rotating duct tube being supported/mounted (radially) toward the outside on the stator/stator housing or the like and the spindle tube being fixed/mounted on the rotary feedthrough. In the last-mentioned case, a rotary bearing arrangement is only realized indirectly between the spindle tube and the rotatable duct tube, i.e. by means of the stator of the spindle/motor spindle.

In a particular further development of the present invention, the rotatable duct tube is realized as a pull rod for operating the tool clamper. Spindles/motor spindles of today generally already comprise a pull rod, by way of which the tools may be clamped or released, i.e. the tool clamper is operated/run. A so-called releasing unit thus comprises, among other things, a spring system or a disk spring set which holds/presses the tool clamper in a clamping position, i.e. a position which fixes the tool clamper. A counter force is generated onto the spring system or the disk spring set by means of the advantageous pull rod, i.e. the tool clamper is adjusted lengthwise of the rotational axis such that the tool is able to be released or exchanged. The dual use or dual function of the pull rod as an aerosol duct according to the present invention results in a variant of the present invention which is particularly favorable structurally and economically.

As already briefly represented above, it is advantageous for the aerosol unit to be effectively sealed or to comprise at least one sealing element such that as small an amount as possible of aerosol and, above all, as small an amount as possible of aerosol particles are lost or no disadvantageous leakages and contaminants occur inside the spindle/motor spindle. The most varied elastomer seals and/or sliding seals can be provided for this purpose.

Provided in a preferred embodiment of the present invention is at least one sealing unit which includes a sealing element, i.e. a sealing mechanism, which is actuated by means of the pressure of the aerosol applied on the side remote from the tool clamper. The sealing unit or the sealing mechanism is preferably realized as a cylinder-piston unit and/or the sealing element is realized as an adjustable piston, in particular, adjustable in the direction of or lengthwise of the rotational axis of the spindle or of the rotor. This means that it is possible to achieve, in an advantageous manner, an adaptation or sealing of components of the spindle that are adjustable lengthwise of the rotational axis, for example, of a releasing or clamping unit of the tool clamper, in particular, of a pull rod of the releasing or clamping unit.

The piston is advantageously realized as an elastomer element which is adjustable in an advantageous manner lengthwise of the rotational axis of the spindle/motor spindle and/or can be acted upon with pressure of the aerosol/air pressure.

Many rotary feedthroughs which are used in MQL systems—for example, such as produced by Ott-Jakob, Deublin or other suppliers—, are characterized in that the rotary feedthrough—for example, in its non-rotating portion, more precisely in the end region thereof facing the tool spindle—comprises a sealing mechanism which is actuated by pressure applied on the side remote from the tool clamper. As a result of providing the spindle tube mounted on the non-rotating portion of the rotary feedthrough and of feeding the aerosol into the non-rotating portion, without further measures the mechanism is non-active because aerosol pressure no longer acts on the sealing mechanism. In such cases, a preferred configuration of the present invention provides that, in its tube wall, the spindle tube comprises an above-mentioned spindle tube opening or control opening at least intermittently in the region of the non-rotating portion. The result of providing the spindle tube opening or control opening is that the sealing mechanism is acted upon with pressure in a sufficient manner such that it becomes operational again. Lubrication of the spindle tube and/or of the (rotary) bearing arrangement thereof, in particular of the rotary feedthrough or mechanical seal, which has an advantageous effect precisely in the case of modern high-speed motor spindles for example running at up to 20,000 rpm, is brought about in this way at the same time. A spindle tube opening or control opening that is only present intermittently can be realized, in particular, by using an electrically, manually or mechanically actuatable valve such that the defined/metered passage of aerosol is only possible intermittently or is adjustable.

It is advantageous when the non-rotatable bearing arrangement of the spindle tube is realized on the non-rotating portion of the rotary feedthrough in the region of the duct, which extends in the non-rotating portion, as a result of screwing-in an extension piece, which is penetrated by an opening in which the spindle tube is mounted and through which the aerosol is able to enter into the spindle tube. The bearing configured in such a manner can also be added subsequently to an existing lubrication system, in particular, to a single-duct minimum quantity lubrication system, namely in a simple manner as a result of screwing-in the correspondingly configured extension piece.

An advantageous further development, in this case, provides that the extension piece comprises a compressed air rapid release coupling. This enables particularly simple connection of an aerosol supply line which ensures the supply of the aerosol from the aerosol generator.

It is advantageous in principle to realize the spindle as a motor spindle with an electromagnetic drive system, in particular, with electromagnetic coils and permanent magnets.

BRIEF DESCRIPTION OF THE DRAWINGS

An exemplary embodiment of the present invention is shown in the drawing and is explained in more detail below by way of figures, in which.

DETAILED DESCRIPTION OF THE INVENTION

Figure 1:
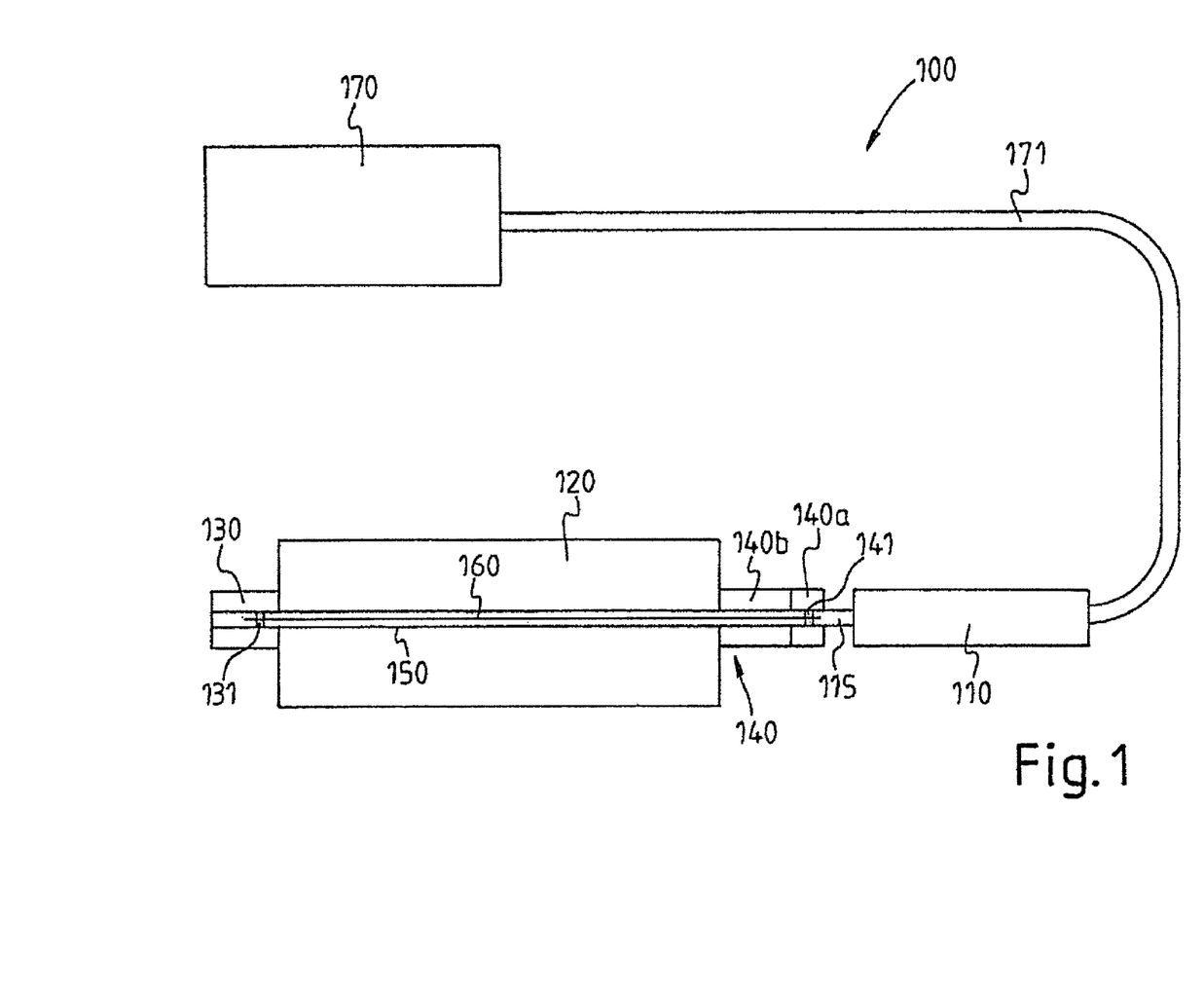
FIG. 1 shows a schematic design of a single-duct MQL system according to the present invention.

FIG. 1 shows a lubrication system 100, in particular, a so-called single-duct minimum quantity lubrication system 100 having an aerosol generator 110 for generating aerosol A, a spindle 120 driven by a motor, a tool clamper 130 arranged on the spindle 120 and a rotary feedthrough 140 arranged on the side of the spindle 120 located opposite the tool clamper 130 with a non-rotatably mounted, non-rotating portion 140a and a portion 140b which is entrained with the spindle 120. The tool clamper 130, the spindle 120 and the rotary feedthrough 140 are penetrated by a duct 150 which is connected to the aerosol generator 110 by means of a feed line 115.

A spindle tube 160, which is shown simply as a line in the schematic sketch according to FIG. 1, is arranged in the duct 150. The spindle tube 160 is non-rotatably mounted on the non-rotating portion 140a of the rotary feedthrough by way of a bearing 141 and extends through the spindle 120 in the direction of the tool clamper 130 where it is mounted in a bearing 131 so as to be rotatable. In the exemplary embodiment shown according to FIG. 1, the spindle tube 160 leads into the tool clamper 130.

By a bearing 141 sealing the cross section of the duct 150 against the passage of aerosol, the aerosol generator 110 is consequently connected in such a manner to the spindle tube 160 that aerosol is only guided through the spindle tube 160 to the tool clamper 130 and/or to a tool that is arranged therein, is not shown and can be clamped by the tool clamper 130.

The spindle 120, tool clamper 130 and rotary feedthrough 140 with the duct 150 which penetrates them and the spindle tube 160 which is arranged therein, in this case, form an assembly which is designated below as "spindle assembly" 101.

The duct 150 and the spindle tube 160, in a preferred manner, have a circular cross section and are arranged concentrically to one another on the common rotational axis of spindle 120 with the tool clamper 130 arranged thereon and the rotary feedthrough 140.

The spindle 120 comprises a stator 123 and a rotor 124 and is preferably realized as a motor spindle. In an advantageous manner, the rotor 124 includes permanent magnets and the stator 123 electromagnetic coils as the drive means. In addition, advantageous roller bearings are provided for the bearing arrangement of the rotor 124 in the stator 123.

Furthermore, the single-duct MQL system 100 shown also comprises a control and power supply unit 170 which is connected via a power chain 171 to the aerosol generating means and to the spindle drive which is not shown separately.

Figure 2:
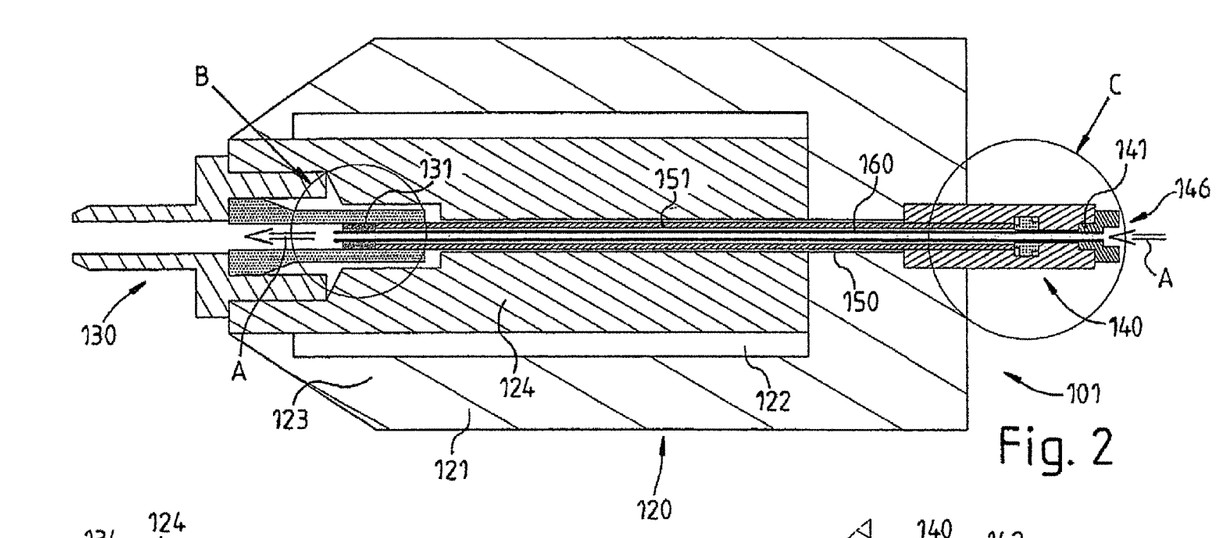
FIG. 2 shows a schematic design of a first motor spindle of the single-duct MQL system according to FIG. 1.

The cross-sectional representation of the spindle assembly 101 of the single-duct MQL system 100 of FIG. 2 reproduces the fundamental design of the spindle assembly 101 in a rough manner. In particular, it shows that the spindle 120 is rotatably mounted in a spindle housing 121 or stator housing. The space 122 available between spindle 120 and spindle housing 121 is usually used in order to accommodate the spindle drive (not shown) in the form of a motor with a rotor 124 that rests on the spindle 120 and a stator 123 that surrounds the rotor 124.

Figure 5:
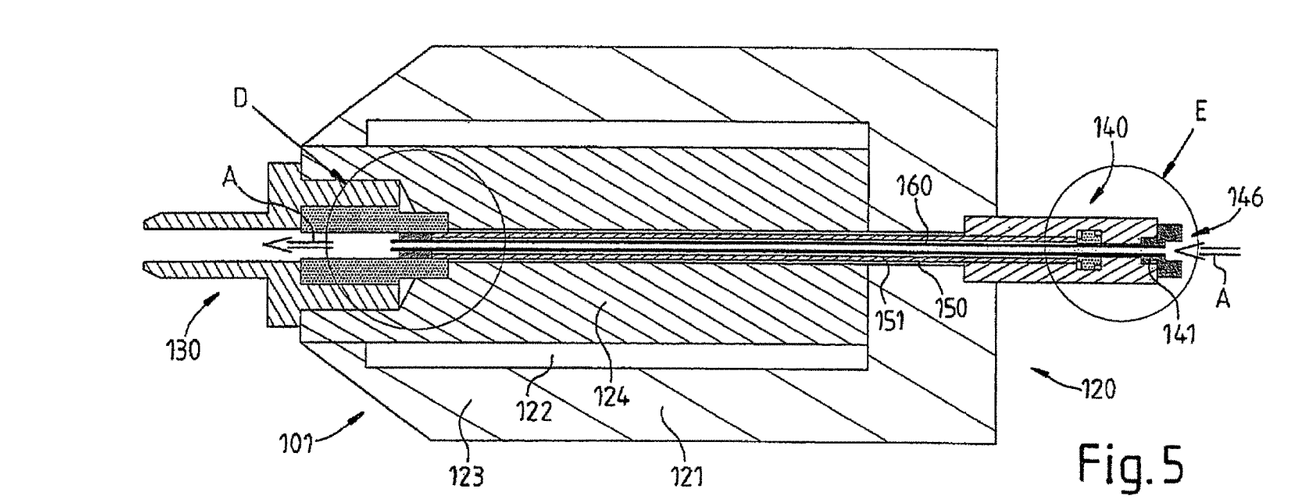
FIG. 5 shows a schematic design of a second motor spindle of the single-duct MQL system according to FIG. 1.

Furthermore, pull rods 151 which are arranged in the duct 150 for operating the tool clamper 130 are shown, among other things, in FIG. 2 or 5.

Figure 3:
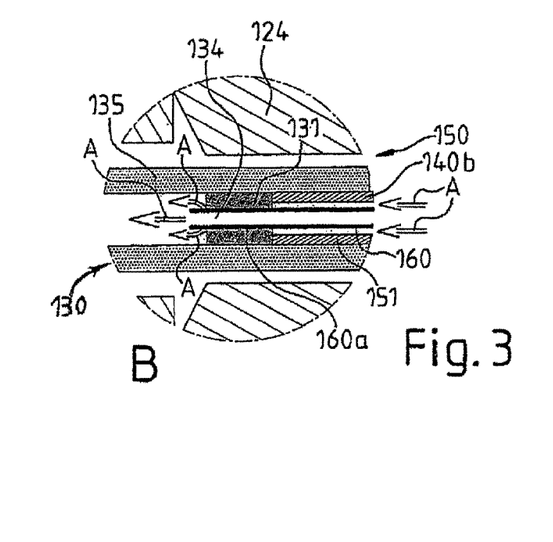
FIG. 3 shows a schematic, front detail of the first motor spindle of the single-duct MQL system according to FIG. 2.

FIG. 3 shows an enlargement of a detail of the front portion, marked with a B, of the tool clamper 130 of the spindle assembly 101 of the single-duct MQL system 100 according to FIG. 2. A portion 160a of the spindle tube 160, which is rotatably mounted in a bearing 131 which is realized as an example as a needle bearing, opens out in the portion of the duct 150. Arbitrary other bearings can also be used.

The bearing 131, which is realized as a needle bearing, is in an advantageous manner electrically insulated radially toward the outside, i.e. in particular in relation to the surrounding area or to further components of the rotor 124, the pull rod 151 and the stator 123 by means of a socket or a hollow cylinder element or the like produced from electrically insulating material, for example ceramic, plastics material etc. The bearing 131 can also be realized in an electrically insulating manner as a ceramic roller bearing, for example, ceramic rolling bodies/ceramic balls etc. and/or an inner race and/or an outer race produced from ceramic material being provided.

For example, the arrangement/unit is received and fixed in the end portion of a counter screw, which is screwed in the inner wall of the portion of the duct 150 and is penetrated by an opening 134 which opens out in a coolant transfer tube 135. A reliable mechanical bearing arrangement with a degree of rotational freedom is ensured in this way for the spindle tube 160, the bearing arrangement nevertheless ensuring the electrical insulation thereof in relation to the tool clamper 130.

In an advantageous manner, a second bearing 141, i.e. on the other/oppositely situated end of the spindle tube 160, is also advantageously realized in an electrically insulating manner. Consequently, even an electrically conducting spindle tube 160, for example, produced from steel or the like, is electrically insulated by the aforementioned advantageous bearing arrangement 131, 141. The achievement here is that electrically charged aerosol A is not condensed on the inner wall of the spindle tube or attracted electrically by the inner wall and does not flow with the entire aerosol stream in the direction of the tool clamper 130. Electric insulation of the spindle tube 160 is advantageous in principle, i.e. both for a spindle tube 160 which consists of electrically conducting material or of material that is not electrically conducting and/or is mounted/arranged non-rotatably or statically or rotatably/rotationally in the spindle assembly 101.

Figure 4:
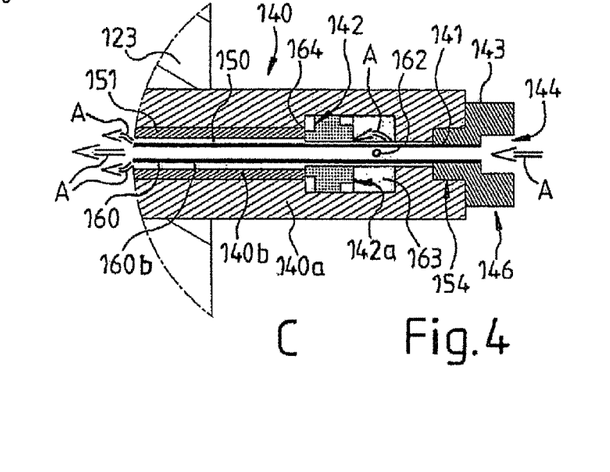
FIG. 4 shows a schematic, rear detail of the first motor spindle of the single-duct MQL system according to FIG. 2.

FIG. 4 shows an enlargement of a detail of the rear portion, marked with C, of the rotary feedthrough 140 with the non-rotatably mounted, non-rotating portion 140a and with the portion 140b of the spindle assembly 101 of the single-duct MQL system 100 which entrains the spindle 120.

A sealing unit 142 or a sealing mechanism 142 of the rotary feedthrough 140 can be seen, in particular in the representation, the sealing unit or sealing mechanism developing a sealing action on a sealing surface 164 when pressure is applied from its side 142a remote from the tool clamper 130 or from a cylinder pressure chamber 163.

In an advantageous variant of the present invention, the sealing mechanism 142 or the sealing element thereof, which is adjustable in the direction of the rotational axis, is realized as a piston of a cylinder-piston unit. This makes it possible to ensure the tightness of the aerosol duct or of the aerosol line inside the spindle 120 or the rotor 124 when a length of the pull rod 151 is adjusted, in particular, for releasing the tool clamper 130 in operation and/or on account of thermal linear deformation of the participating components. Leaks of lubricant and/or coolant are effectively prevented in this way.

In order to make possible such an application of pressure in spite of providing the spindle tube 160, the spindle tube, in an advantageous manner, comprises a control opening 162 which is realized in the example as a bore or opening 162, through which the aerosol A or compressed air with aerosol particles contained therein is able to pass into a clear or outer, ring-shaped/hollow-cylindrical portion of the duct 150 such that the required pressure is built up. A valve can also be inserted into the control opening 162, the valve only releasing the control opening intermittently.

Thus, a primary flow of the aerosol A is produced inside the spindle tube 160 and a secondary flow of the aerosol A is produced concentrically about the spindle tube 160, i.e. externally between the outer wall of the spindle tube 160 and, among other things, the inner wall of the pull rod 151, which is also realized, as a result, as an aerosol duct 151 in terms of the present invention.

Furthermore, the achievement of the sealing mechanism 142 or the concentric arrangement of (stationary) spindle tube 160 with an outer, sealed (rotatable) aerosol duct or pull rod 151 is that aerosol A flows from the "rear region" of the spindle 120 corresponding to a certain pressure gradient in a "forward" direction or to the tool clamper 130 and consequently in an advantageous manner supplies or lubricates the rotary bearing arrangement 131 or the sliding bearing and/or needle bearing 131 with lubricant/coolant. This is particularly advantageous precisely in the case of modern high-speed motor spindles running at, in part, approximately 20,000 rpm. Inside the outer annular duct, i.e. between spindle tube 160 and pull rod 151, lubricant and/or coolant can also definitely be condensed on the side walls as liquid film, without this being disadvantageous. For, in this connection, the only thing that is of paramount importance is that the lubricant and/or coolant is/are transported to the bearing 131 by means of the flow of the aerosol A and the bearing is lubricated in order to realize a long service life or to prevent increased wear. A precisely metered or changing quantity of lubrication is of secondary importance.

In contrast, it is possible to realize advantageous metering or as precise as possible an adaptation of the quantity of the aerosol A or of the lubricant and/or coolant according to the present invention with reference to the supply of the tool clamper 130 or of the tool/workpiece. Thus, according to the present invention, advantageous minimum quantity lubrication can be realized as a result of avoiding disadvantageous or unwanted condensing of the aerosol particles or of the lubricant and/or coolant inside the spindle tube 160 and/or inside the spindle 120 or the rotor 124 at unwanted points. Correspondingly, as in the prior art, compensation of the condensation/deposits/leaks of the lubricant and/or coolant inside the spindle 120 or spindle assembly 101 according to the present invention is unnecessary such that the quantity of lubricant/coolant used/consumed is minimized or optimized.

Equally easy to see in the representation in FIG. 4 is the manner in which the bearing arrangement of the spindle tube 160 is realized with its portion 160b on the non-rotating portion 140b of the rotary feedthrough 140. In the end region of the portion of the duct 150 that penetrates the rotary feedthrough, a thread 154, for example, is cut into its wall surface, in which is screwed, in an advantageous manner, an extension piece 143, which is realized as a screw extension and is penetrated in an advantageous manner by a bore 144, into which is fitted the bearing 141 which is realized as a socket or cone produced from electrically conducting material. The portion 160b of the spindle tube 160 is inserted in an advantageous manner into the bearing 141, more precisely into the interior of the socket, the relative diameters being chosen such that the spindle tube 160 is clamped or sealed in the bearing 141. Access of the aerosol A to the spindle tube 160 is preferably ensured as a result of a compressed air quick release coupling 146 which is connected to the screw extension 143. Correspondingly, entry of the aerosol into the spindle tube 160 is possible, but entry into the duct 150 is not.

Figure 6:
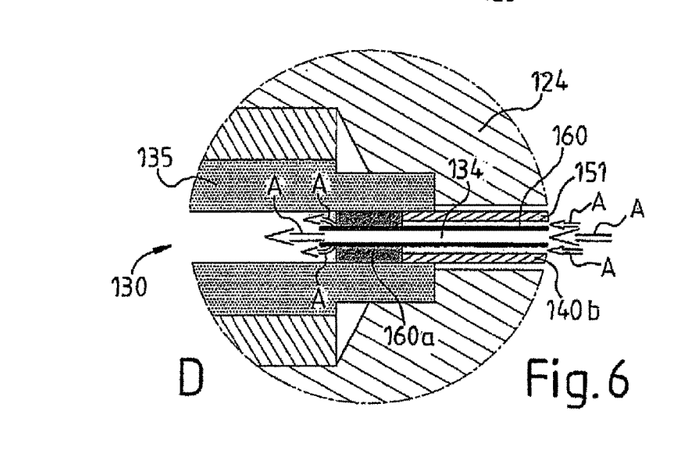
FIG. 6 shows a schematic, front detail of the second motor spindle of the single-duct MQL system according to FIG. 5.
Figure 7:
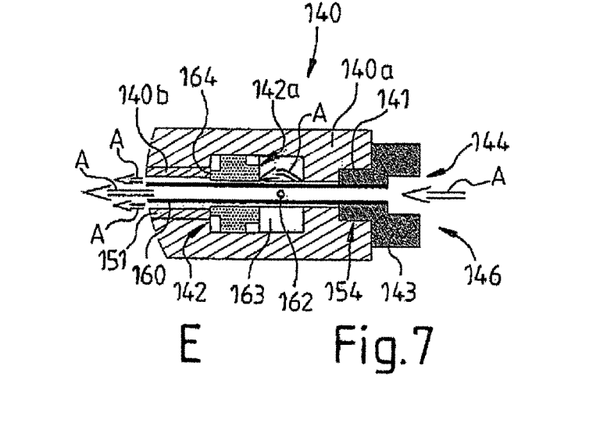
FIG. 7 shows a schematic, rear detail of the second motor spindle of the single-duct MQL system according to FIG. 5.

A manual tool clamper 130 is realized in the case of the second embodiment of the spindle assembly 101 or motor spindle according to FIGS. 5, 6, and 7. The elements/components shown otherwise correspond substantially to those of the first embodiment of the spindle assembly 101 or motor spindle according to FIGS. 2, 3 and 4.

A single-duct minimum quantity lubrication system 100, having an aerosol generator 110, a spindle 120, a tool clamper 130 arranged on the spindle 120 and a rotary feedthrough 140 arranged on the side of the spindle 120 located opposite the tool clamper 130, wherein the tool clamper 130, the spindle 120 and the rotary feedthrough 140 are penetrated by a duct 150, wherein in the duct 150 is arranged a spindle tube 160 which is mounted in a non-rotatable manner on the non-rotating portion 140a of the rotary feedthrough 140 and extends at least through a portion of the spindle 120 in the direction toward the tool clamper 130 and the aerosol generator 110 is connected to the spindle tube 160 such that the aerosol is guided through the spindle tube 160 in the direction of the tool clamper 130 and/or of a tool clamped by the tool clamper 130.

In the case of the single-duct minimum quantity lubrication system 100, the rotary feedthrough 140 preferably comprises a sealing mechanism 142 which is actuated by means of pressure applied on the side 142a remote from the tool clamper 130, and the spindle tube 160 comprises, at least intermittently, a control opening 162 in the region of the non-rotating portion 140a of the rotary feedthrough.

In a preferred manner in the case of a single-duct minimum quantity lubrication system 100, the spindle tube 160 is rotatably mounted on the tool clamper 130.

For example, for the rotatable bearing arrangement of the spindle tube 160 on the tool clamper 130, a counter screw 133 is screwed with a bearing 131 in the portion 150a of the duct 150 which extends in the tool clamper 130, the counter screw being penetrated by an opening 134 such that aerosol emerging out of the spindle tube 160 is guided into a coolant transfer tube 135.

Where applicable, for the non-rotatable bearing arrangement of the spindle tube 160 on the non-rotating portion 140a of the rotary feedthrough 140, an extension piece 143, which is penetrated by an opening 144 in which the spindle tube 160 is mounted and through which the aerosol is able to enter into the spindle tube 160, is screwed in the portion 150b of the duct 150 which extends in the non-rotating portion 140a of the rotary feedthrough 140.

It is advantageous when the extension piece 143 comprises a compressed air rapid release coupling 146.

In general, the lubrication system is advantageous where the spindle tube 160 is mounted in an electrically insulating manner on the rotary feedthrough 140 and/or on the tool spanner 130.

For example, the spindle tube 160 is non-rotatably mounted on the non-rotating portion 140a of the rotary feedthrough 140 by means of a plug connection with a socket or a cone produced from electrically insulating material which is connected directly or indirectly to the non-rotating portion 140a of the rotary feedthrough 140 and/or the spindle tube 160 is mounted on the tool clamper 130 so as to be rotatable in a bearing 131 which is connected directly or indirectly to the tool clamper 130 by means of a socket 132 or a cone produced from electrically insulating material.

A lubrication system is advantageous as an alternative to or in combination with the aforementioned variants where the spindle tube 160 is produced from a material that is not electrically conducting.

LIST OF REFERENCE

100 Single-duct minimum quantity lubrication system
101 Spindle assembly
110 Aerosol generator
115 Feed line
120 Spindle
121 Spindle housing
122 Space
123 Stator
124 Rotor
130 Tool clamper
131 Bearing
134 Opening
135 Coolant transfer tube
140 Rotary feedthrough
140a Non-rotating portion
140b Entrained portion
141 Bearing
142 Sealing mechanism
142a Side of the sealing mechanism
143 Extension piece
144 Bore
146 Compressed air rapid release coupling
150 Duct
151 Pull rod
154 Thread
160 Spindle tube
160a Portion of the spindle tube
160b Portion of the spindle tube
162 Control opening
163 Cylinder pressure chamber
164 Sealing surface
170 Control and power supply means
171 Power chain
A Aerosol

The invention claimed is:

1. A single-duct minimum quantity lubrication system, having an aerosol generator, a spindle, a tool clamper arranged on the spindle and the aerosol generator, a bearing, and a rotary feedthrough arranged on a side of the spindle located opposite the tool clamper, wherein the tool damper, the spindle and the rotary feedthrough are penetrated by a duct, the duct having a length, wherein a non-rotating spindle tube having substantially the same length as the duct is arranged within the duct, such that the spindle tube is mounted within the duct in an electrically insulating manner and/or in that the spindle tube is produced from a material that is not electrically conducting and/or in that the spindle tube and/or the duct is/are provided with at least one electrically insulating layer for coating the spindle tube and/or the duct in an electrically insulating manner, wherein the bearing seals the duct from passage of aerosol therethrough, and wherein the aerosol generator supplies aerosol to the tool damper only through the non-rotating spindle tube.

2. The single-duct minimum quantity lubrication system as claimed in claim 1, wherein the spindle tube is mounted in an electrically insulating manner on the rotary feedthrough and/or on the tool clamper.

3. The single-duct minimum quantity lubrication system as claimed in claim 1, wherein the spindle tube is mounted in a non-rotatable manner on a non-rotating portion of the rotary feedthrough by means of a plug connection with a socket or a cone produced from electrically insulating material which is connected directly or indirectly to the non-rotating portion of the rotary feedthrough and/or in that the spindle tube is mounted on the tool clamper so as to be rotatable in a bearing which is connected directly or indirectly to the tool clamper by means of a socket or a cone produced from the electrically insulating material.

4. The single-duct minimum quantity lubrication system as claimed in claim 1, further comprising a separate aerosol generator to generate the aerosol therein and to feed the aerosol into an aerosol line and from there to supply the aerosol via the rotary feedthrough, the spindle and the tool clamper to a tool.

5. The single-duct minimum quantity lubrication system as claimed in claim 1, wherein the spindle tube is non-rotatably mounted on a non-rotating portion of the rotary feedthrough in the duct and extends in the direction toward the tool damper at least through a portion of the spindle and in that the aerosol generator is connected to the spindle tube such that aerosol is guided through the spindle tube in the direction of the tool clamper and/or of a tool clamped by the tool clamper.

6. The single-duct minimum quantity lubrication system as claimed in claim 1, wherein the spindle tube is rotatably mounted on the tool clamper.

7. The single-duct minimum quantity lubrication system as claimed in claim 1, wherein the spindle tube is arranged at least in part inside an aerosol duct for the conveying/guiding of aerosol such that aerosol is conveyed/guided both on an inner wall of the spindle tube and in part on an outer wall of the spindle tube.

8. The single-duct minimum quantity lubrication system as claimed in claim 1, wherein the spindle tube comprises at least one outlet opening to configured to pass aerosol therethrough.

9. The single-duct minimum quantity lubrication system as claimed in claim 1, wherein an aerosol duct is realized as a rotatable duct tube.

10. The single-duct minimum quantity lubrication system as claimed in claim 9, wherein the rotatable duct tube is realized as a pull rod for operating the tool clamper.

* * * * *